May 5, 1964     V. C. MARTIN     3,132,337
VARIABLE RELUCTANCE SLOTTED DRUM POSITION INDICATING DEVICE
Filed Sept. 12, 1960     2 Sheets-Sheet 1

INVENTOR
VAN C. MARTIN

BY Donald F. Voss

ATTORNEY

May 5, 1964

V. C. MARTIN 3,132,337

VARIABLE RELUCTANCE SLOTTED DRUM POSITION INDICATING DEVICE

Filed Sept. 12, 1960

3,132,337
VARIABLE RELUCTANCE SLOTTED DRUM POSITION INDICATING DEVICE
Van C. Martin, Endicott, N.Y., assignor to International Business Machines Corporation, New York, N.Y., a corporation of New York
Filed Sept. 12, 1960, Ser. No. 55,408
3 Claims. (Cl. 340—347)

This invention relates to an electrical impulse generator for generating a plurality of unique electrical impulses and, more particularly, to a magnetic type of an emitter employing a single transducer or magnetic pickup head for generating a plurality of unique electrical impulses.

In many instances, because of spatial requirements, it is physically difficult or impractical to arrange a series of transducers relative to movable impulse generating apparatus. However, generally, a single transducer can be properly positioned. Aside from spatial requirements, the ability to obtain several unique electrical impulses when utilizing a single transducer results in less expensive apparatus.

Among other uses, the present invention is particularly suited to indicate discrete positions of a moving member. The movement of the member to be positioned may be translational or rotational.

In the present invention, an electrical signal or impulse is developed as the magnetic transducer senses a change in reluctance. For each discrete position of the moving member, there is a different magnitude of change in reluctance. Hence, the amplitude of the signal developed will vary for each discrete position. Circuitry is provided to discriminate between the amplitudes of the signals developed. In this manner, a unique output signal is provided for each discrete position of the moving member and the unique output signals can be distinguished from each other.

The invention can take the form of a rotatable nonmagnetic disc having a series of arcuately spaced segments of magnetic material. Each of the segments of magnetic material vary in size in a manner so as not to reduce the resolution or range of accuracy.

A magnetic pickup head consisting of a permanent bar magnet and a soft iron core wound with a sufficient number of turns of wire for sensing the changing magnetic flux linkages is mounted in close proximity to the peripheral surface of the rotatable disc. Hence, as the disc rotates, a different size magnetic segment is passed relative to the magnetic pickup head, to generate an electrical signal corresponding to the change in magnetic flux linkages. The output of the magnetic pickup head is commonly connected to a number of voltage level discriminators corresponding to the number of segments or discrete positions on the disc. The outputs of the voltage level discriminators are connected to associated logical AND circuits to provide separate outputs for the signals developed by the various magnetic segments.

Accordingly, a prime object of the invention is to provide an improved arrangement of apparatus which develops a plurality of unique electrical signals to indicate discrete positions of a movable member relative to a home position.

Another object of the invention is to provide apparatus for generating an electrical signal of a predetermined amplitude when a discrete position of a movable member passes relative to a home position.

Still another object of the invention is to provide a position indicating device which is relatively inexpensive.

The foregoing and other objects, features and advantages of the invention will be apparent from the following more particular description of preferred embodiments of the invention, as illustrated in the accompanying drawings.

Figure 1:
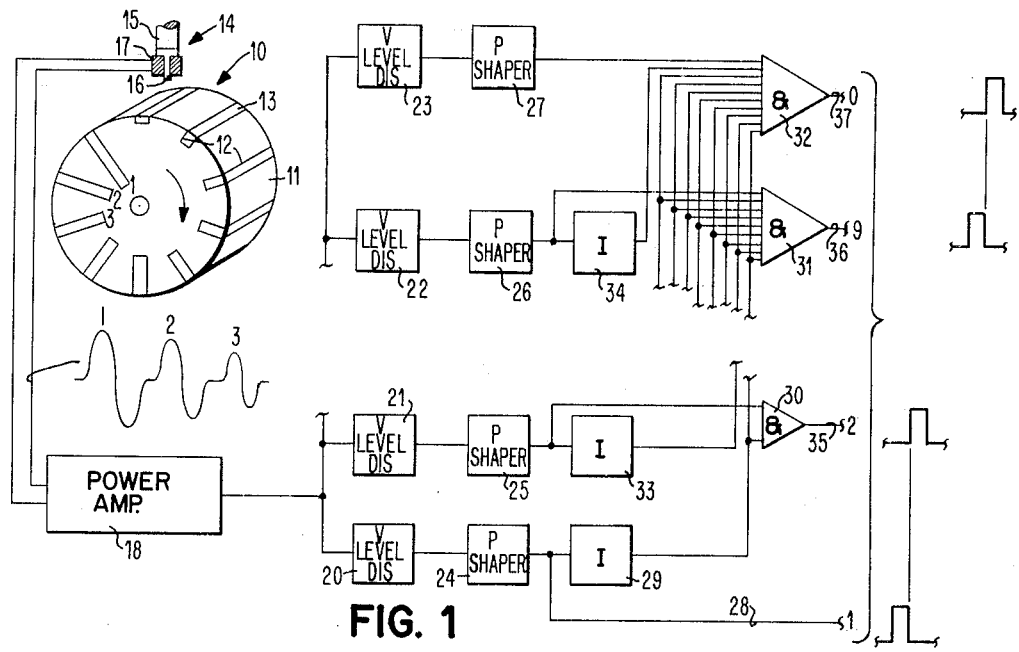
FIG. 1 is a schematic diagram showing one embodiment of the magnetic type of emitter and single magnetic pickup head and the circuitry for discriminating the different signals developed.

Referring to the drawings and particularly to FIG. 1, the invention is illustrated by way of example as a magnetic emitter 10 in the form of a drum 11 made of nonmagnetic material and provided with a plurality of arcuately spaced outwardly opening slots 12, each being of a different depth. The slots 12 are completely filled with slugs of ferromagnetic material 13 such as steel. The drum 11 is adapted to be rotated by any suitable source.

A magnetic pickup head 14 is mounted in a discrete position in close proximity to the peripheral surface of the drum 11. The magnetic pickup head 14 consists of a permanent bar magnet 15 fixed at one end to a soft iron core 16 wound with a sufficient number of turns of wire 17 for sensing the changing magnetic flux linkages. In this example, the soft iron core 16 is wound with 2500 turns of wire. When any one of the slugs of ferromagnetic material 13 passes under the magnetic pickup head 14 at N inches per second, the reluctance of the magnetic path is momentarily reduced. This results in an increase of the lines of magnetic flux linking the 2500 turns in the sense winding 17 of the magnetic pickup head 14. Hence, a voltage signal is developed according to the following formula:

$$e = \frac{N d\phi}{dt}$$

where N is the number of turns of wire, $d\phi$ is the change in the number of lines of magnetic flux linking the turns of the wire 17 and $dt$ is the time involved. Since each slug of ferromagnetic material 13 fixed in the slots 12 formed in the nonmagnetic drum 11 varies in size, the change in reluctance of the magnetic path varies differently as the slugs of ferromagnetic material 13 pass relative to the magnetic pickup head 14. Hence, a signal having a different peak voltage amplitude will be produced in the sense windings 17 of the magnetic pickup head 14 by each slug of ferromagnetic material 13.

The different signals produced by the various size slugs of ferromagnetic material 13 are discretely identified by means of voltage amplitude discrimination circuitry. In FIG. 1, the output of the magnetic pickup head 14 is connected to the input of a power amplifier 18 of a type well known in the art. The output of the power amplifier is commonly connected to the inputs of a series of voltage level discriminator blocks 20, 21, 22 and 23 corresponding in number to the number of slugs of ferromagnetic material 13. However, only the level discriminators for the first, second, ninth and tenth slugs are shown. The voltage level discriminators are shown in detail in FIG. 2. The outputs from the voltage level discriminator blocks 20, 21, 22 and 23 are connected to corresponding pulse shapers 24, 25, 26 and 27. The pulse shapers 24, 25, 26 and 27 in this example are single-shot multivibrators.

The output of pulse shaper 24 is connected to output conductor 28 and to the input of inverter 29. The output of the inverter 29 is connected as an input to logical AND circuits 30, 31 and 32. The output of the pulse shaper 25 is connected as an input to the logical AND circuit 30 and as an input to an inverter 33. The output of the inverter 33 is connected as an input to logical AND circuits 31 and 32. The output of pulse shaper 26 is connected as an input to logical AND circuit 31 and as an input to an inverter 34. The output of the inverter 34 is connected as an input to logical AND circuit 32. The output of pulse shaper 27 is connected as an input to logical AND circuit 32. The outputs of logical AND circuits 30, 31 and 32 are connected to output lines 35, 36 and 37, respectively. By this arrangement, the outputs from the voltage level discriminators are shaped and decoded so that only one output is produced as each ferromagnetic slug 13 is sensed.

The largest ferromagnetic slug 13, labeled (1), produces a voltage signal having the largest amplitude. This voltage signal, labeled (1), switches voltages level discriminators 20, 21, 22 and 23. However, there will only be an output signal on line 28 because inverters 29, 33 and 34 will be conducting and the logical AND circuits 30, 31 and 32 consequently will not be conditioned to pass the signal coming from the pulse shapers 25, 26 and 27.

The voltage signal produced by the ferromagnetic slug 13, labeled (2), will not switch voltage level discriminator 20 but switches voltage level discriminators 21, 22 and 23. Accordingly, there will be an output on line 35 because logical AND circuit 30 is conditioned by inverter 29 to pass the signal coming from pulse shaper 25, but logical AND circuits 31 and 32 will not be conditioned to pass the signals from pulse shapers 26 and 27, respectively, because inverters 33 and 34 are conductive. Of course, since there is no output from pulse shaper 24, there will be no output signal at this time on line 28. Likewise, the third largest ferromagnetic slug 13 will produce a voltage signal which will switch a voltage level discriminator, not shown, corresponding to the third largest ferromagnetic slug 13, as well as switching voltage level discriminators 22 and 23, but will not switch voltage level discriminators 20 and 21. Generally, since the size of the ferromagnetic slugs varies progressively, the voltage level discriminator associated with one of the slugs accepts the peak amplitudes developed by all slugs which are larger but not the peak amplitudes developed by the smaller size slugs. In order to eliminate a certain amount of repetition, only the voltage level discriminators corresponding to the first, second, ninth and tenth ferromagnetic slugs 13 have been shown. Because the tenth ferromagnetic slug 13 generates a voltage signal having the smallest amplitude, the voltage level discriminator 23, corresponding thereto, will be switched everytime any of the other ferromagnetic slugs 13 pass relative to the magnetic head 14. However, there will be an output on output line 37 only when the tenth ferromagnetic slug 13 passes relative to magnetic head 14 because this is the only time that the logical AND circuit 32 will be conditioned to pass the signal coming from pulse shaper 27. The reason for this is that at all other times one of the inverters will be conducting and, therefore, the logical AND circuit 32 at these other times will not be conditioned to pass a signal from pulse shaper 27. The voltage signal generated by the tenth ferromagnetic slug 13 switches only the voltage level discriminator 23 and not any of the other voltage level discriminators. Hence, the inverters, such as inverters 29, 33 and 34 will not be conducting and the logical AND circuit 32 will be conditioned to pass the signal coming from pulse shaper 27. The other logical AND circuits, such as logical AND circuits 35 and 36, are also conditioned to pass a signal; but no signal is available thereto to be passed.

The size of the ferromagnetic slugs can be varied in any one of a number of combinations. In order to preserve the resolution of the magnetic emitter, the dimensions of the ferromagnetic slugs should vary in either width or depth rather than slug thickness. While FIG. 2 shows another embodiment of the invention, as well as greater detail of the circuitry in FIG. 1, like members will be given like reference characters.

Figure 2:
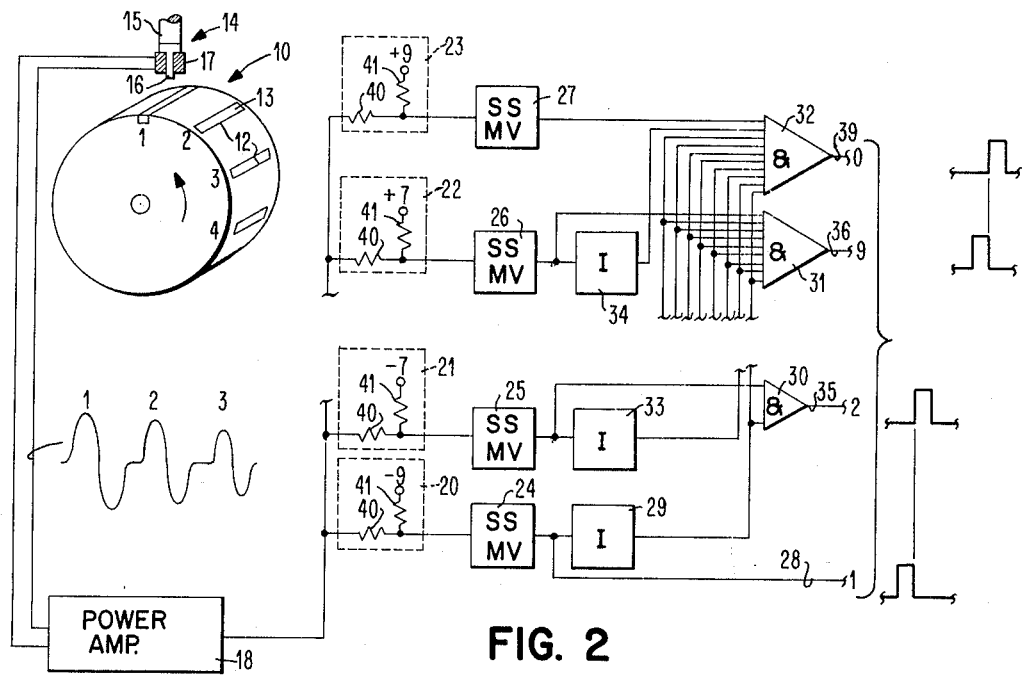
FIG. 2 is a schematic diagram showing another embodiment of the magnetic type of emitter and single magnetic pickup head and a more detailed showing of the circuitry of FIG. 1.

FIG. 2 shows a drum of nonmagnetic material having slots 12 of different width, each filled with a ferromagnetic slug 13. For each particular slug of ferromagnetic material 13, there will be a different change in the number of lines of magnetic flux linking the turns of sense winding 17 of magnetic pickup head 14. The voltage amplitude discriminating circuitry and the discrete output decoding circuitry are substantially the same for this embodiment as for the magnetic emitter 10, as shown in FIG. 1. The circuitry shown in FIG. 2 shows the details of the voltage level discriminating blocks 20, 21, 22 and 23 of FIG. 1. Essentially, each voltage level discriminating block consists of a pair of resistors 40 and 41 with resistor 41 connected to a particular voltage level. Each pair of resistors 40 and 41 form an input circuit to one of the pulse shapers 24, 25, 26 and 27, which are single-shot multivibrators. The remaining portion of the circuitry includes the inverters 29, 33 and 34 and logical AND circuits 30, 31 and 32, which are the same as shown in FIG. 1. The ferromagnetic slugs 13 generate voltage signals of different amplitudes just as those shown in FIG. 1, and the discriminating and decoding of these signals takes place in substantially the same manner. Hence, there will be no further description concerning the embodiment shown in FIG. 2.

Figure 3:
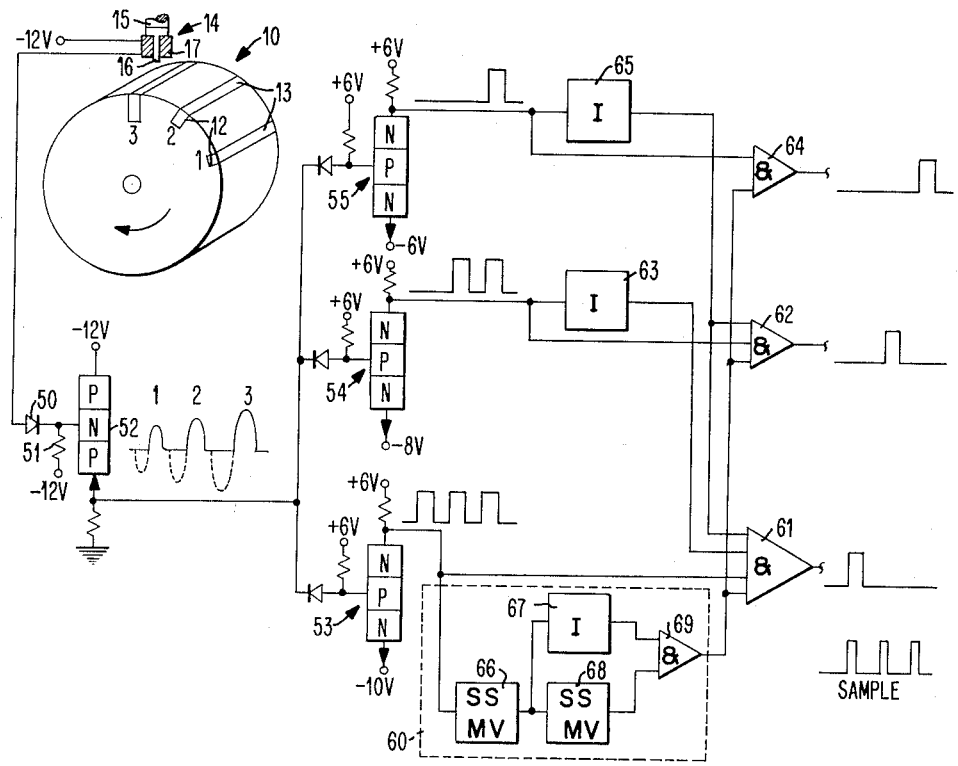
FIG. 3 is a schematic diagram showing the embodiment of the magnetic type of emitter and single magnetic pickup head as in FIG. 1 but with a different circuit for discriminating the different signals developed.

While magnetic emitter 10 shown in FIG. 3 is substantially the same as that shown in FIG. 1, the circuitry for discriminating between the various signals developed is quite different. The circuitry of FIG. 3 is adapted to give faster switching times and a sampled output.

One lead of sense winding 17 of magnetic pickup head 14 is referenced to a minus voltage while the other lead is connected to a diode 50 referenced through a resistor 51 to $-12$ volts. By this arrangement, the negative half cycle of the sensed output is clipped by the diode 50. The diode 50 is connected to the base of an emitter follower transistor 52 which functions to maintain the true amplitude of the positive half cycles. The output of the emitter follower 52 is connected to the inputs of voltage level discriminators 53, 54 and 55; in this instance, the voltage discriminators are transistors of NPN configuration with a diode input to the base.

The voltage level discriminators 53, 54 and 55 switch when their inputs go more positive than the emitter return voltages thereof. Because of this arrangement, a peak time sample circuit 60 is provided so that the outputs will be sampled only at peak times to eliminate any false outputs.

The voltage level discriminator 53 is switched by all of the signals developed by the ferromagnetic slugs 13 and its output is connected to the peak time sample circuit 60 and to a logical AND circuit 61. Voltage level discriminator 54 is switched only by the ferromagnetic slugs 13 labeled (2) and (3) and its output is connected to a logical AND circuit 62 and to the input of a logical inverter 63 having its output connected to logical AND circuit 61. Voltage level discriminator 55 is switched only by ferromagnetic slug 13, labeled (3), and its output is connected to the input of a logical AND circuit 64 and to the input of a logical inverter 65 having its output connected to the inputs of logical AND circuits 61 and 62.

The peak time sample circuit 60 conditions the logical AND circuits 61, 62 and 64 at peak output times to avoid false outputs as the voltage signals rise and fall. The peak time sample circuit 60 includes a single-shot multivibrator 66 having an input from the voltage level discriminator 53 and has a time duration of T microseconds. The output of the single-shot multivibrator 66 is connected as an input to a logical inverter 67 and as an input to another single-shot multivibrator 68 having a duration of T+10 microseconds. The output of the logical inverter 67 is connected as an input to a logical AND circuit 69 also having an input from the output of the second single-shot multivibrator 68. The output of the logical AND circuit 69 is connected as an input to logical AND circuits 61, 62 and 64.

The logical AND circuits 61, 62 and 64 will be conditioned to pass the signals only during the ten microseconds after time T. For example, when the first ferromagnetic slug passes relative to the magnetic head, a voltage signal is developed which switches the voltage level discriminator 53. The voltage level discriminators 54 and 55 will not be switched at this time. Consequently, a signal will not be available at logical AND circuits 62 and 64, but a signal will be available at AND circuit 61. Further, logical AND circuit 61 will be conditioned by inverters 63 and 65 to pass the signal coming from the voltage level discriminator 53. However, this signal will not be passed until the logical AND circuit 61 is further conditioned by the peak time sample circuit 60. With the voltage level discriminator 53 switched, the single-shot multivibrator 66 transfers. This causes the single-shot multivibrator 68 also to transfer. However, the logical AND circuit 69 will not pass the signal from the single-shot multivibrator 68 during time T because inverter 67 inverts the signal from single-shot multivibrator 66. When the single-shot multivibrator 66 retransfers at the end of time T, the inverter 67 does condition logical AND circuit 69, which then receives a signal from single-shot multivibrator 68 having a remaining duration of ten microseconds. Hence, the sample impulse is passed by logical AND circuit 69 to all of the logical AND circuits 61, 62 and 64 to condition the same. However, an output signal to be passed is only available at logical AND circuit 61.

While discriminators 53 and 54 are both switched by the ferromagnetic slug 13 labeled (2), logical AND circuit 61 will not be conditioned at peak sample time to pass the signal coming from discriminator 53 because inverter 63 inverts the signal from discriminator 54. Logical AND circuit 62 will be conditioned at peak sample time to pass the signal from discriminator 54 because discriminator 55 did not switch and, therefore, inverter 65 is not active. Of course, since discriminator 55 did not switch, there is no signal to be passed by logical AND circuit 64.

Discriminators 53, 54 and 55 are each switched by the voltage signal generated by the ferromagnetic slug labeled (3). Under these conditions, only logical AND circuit 64 will be conditioned at peak sample time because inverters 63 and 65 will be active to prevent conditioning of logical AND circuits 61 and 62. Hence, an output signal is passed only by logical AND circuit 64. Since discriminator 53 is switched for each voltage signal developed by the ferromagnetic slugs, the peak amplitude sample circuit will be active each time a signal is developed.

Figure 4:
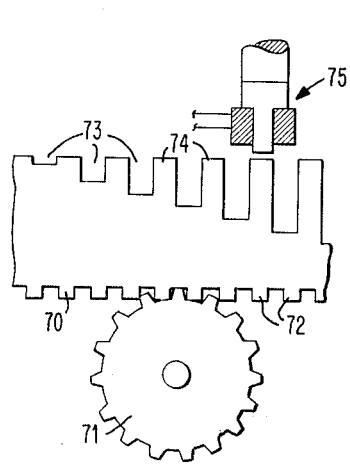
FIG. 4 is a schematic view showing the magnetic emitter in the form of a rack driven by a gear; and, FIG. 5 is a schematic view showing the magnetic emitter as a disc having a plurality of arcuately spaced slots of different depths.

FIG. 4 shows a rack 70 adapted to be driven by a gear 71 which is engaged with teeth 72 formed in rack 70. The rack 70 is also provided with a series of different depth slots 73 forming teeth 74. The different depth slots 73 are sensed by magnetic head 75. As the rack 70 moves relative to the magnetic pickup head 75, voltage signals of different amplitudes will be generated. These voltage signals are then discriminated and decoded by circuitry shown in FIGS. 1, 2 or 3.

Figure 5:
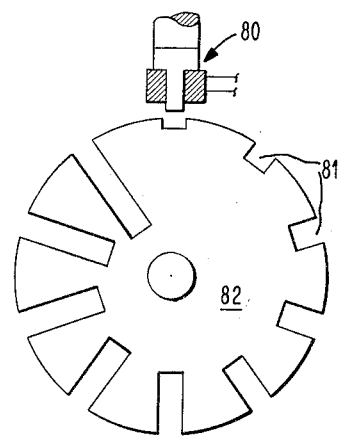

In FIG. 5, a magnetic head 80 is disposed to sense slots 81 of different depths in a rotatable disc 82.

From the foregoing, it is seen that the invention provides for several unique electrical impulses by utilizing a single transducer. Further, the invention is suitable to indicate discrete positions of a moving member.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A position indicator for a movable member comprising a body of nonmagnetic material connected to be moved in synchronism with said movable member, said body having a plurality of spaced openings therein, each opening being progressively of a different size; a slug of magnetic material disposed within each opening in said body, each slug progressively being of a different size to correspond to the different size openings in said body; a magnetic pickup head disposed relative to said body so that said slugs pass relative thereto as said body is moved in synchronism with said movable member, whereby each slug causes a different change in reluctance of the magnetic path within said magnetic pickup head to develop a signal voltage therein of a distinct amplitude; a voltage level discriminator corresponding to each slug connected to said magnetic pickup head to be impulsed thereby and operably responsive to emit an electrical impulse only when the corresponding slug and slugs larger than said corresponding slug pass relative to said magnetic pickup head; an inverter connected to the output of a corresponding voltage level discriminator except for the voltage level discriminator corresponding to the smallest size slug; a logical AND circuit corresponding to each voltage level discriminator except for the voltage level discriminator corresponding to the largest slug, the output of each logical AND circuit providing a discrete electrical impulse; and circuit means connecting the output of each voltage level discriminator to the input of the corresponding logical AND circuit and connecting the output of each inverter to the inputs of all logical AND circuits corresponding to slugs smaller than the slug corresponding to the inverter whereby the corresponding logical AND circuit is conditioned to pass an electrical impulse only when the corresponding slug passes relative to the magnetic pickup head, thereby providing an indication of the position of the body relative to the magnetic pickup head.

2. A position indicator for a movable member comprising a body of nonmagnetic material connected to be moved in synchronism with said movable member, said body having a plurality of spaced openings therein, each opening being progressively of a different size; a slug of magnetic material disposed within each opening in said body, each slug progressively being of a different size to correspond to the different size openings in said body; a magnetic pickup head disposed relative to said body so that said slugs pass relative thereto as said body is moved in synchronism with said movable member, whereby each slug causes a different change in reluctance of the magnetic path in said magnetic pickup head to develop a signal voltage of a distinct amplitude therein; voltage discriminating circuitry connected to said magnetic pickup head and having a plurality of outputs whereby a discrete output signal occurs at the outputs on one output at a time for each slug passing relative to said magnetic pickup head; and voltage peak time sample circuit means connected to said voltage discriminating circuitry whereby the sample is rendered operable substantially during the time that the signal voltage from said magnetic pickup head is at a peak so as to eliminate false outputs from said voltage discriminating circuitry.

3. A position indicator for a movable member as in claim 2 wherein said voltage peak time sample circuit means comprises first and second single-shot multivibrators, said first single-shot multivibrator having its input connected to said voltage discriminating circuitry and its output connected to the input of said second single-shot multivibrator, an inverter having its input connected to the output of said first single-shot multivibrator and a logical AND circuit having inputs connected to the output of said inverter and the output of said second single-shot multivibrator, the output of said logical AND circuit being connected to said voltage discriminating circuitry to condition the same only when the signal voltage from said magnetic head is substantially at a peak.

References Cited in the file of this patent

UNITED STATES PATENTS

| | | |
|---|---|---|
| 1,950,859 | Midgley | Mar. 13, 1934 |
| 1,986,531 | Robb | Jan. 1, 1935 |
| 2,069,780 | Severy | Feb. 9, 1937 |
| 2,656,524 | Gridley | Oct. 20, 1953 |
| 2,789,224 | Leonard | Apr. 16, 1957 |
| 2,929,051 | Pawley | Mar. 15, 1960 |